United States Patent
Crowder et al.

(10) Patent No.: US 11,238,385 B1
(45) Date of Patent: Feb. 1, 2022

(54) DYNAMIC ELECTRONIC NOTIFICATIONS BASED ON CONTEXTUAL DATA

(71) Applicant: Wells Fargo Bank, N.A., San Francisco, CA (US)

(72) Inventors: Richard Randolph Crowder, Glen Allen, VA (US); John C. Brenner, Chesterfield, MO (US); Zar John Toolan, St. Louis, MO (US); Miguel A. Ruiz, Walnut Creek, CA (US); Darrell Todd Slawson, St. Louis, MO (US); Melissa Leisse, Fenton, MO (US); James D. Cahill, Belmont, MA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 571 days.

(21) Appl. No.: 15/152,141

(22) Filed: May 11, 2016

(51) Int. Cl.
*H04L 29/08* (2006.01)
*G06F 16/2455* (2019.01)
*G06Q 10/06* (2012.01)

(52) U.S. Cl.
CPC ... *G06Q 10/06316* (2013.01); *G06F 16/2455* (2019.01); *H04L 67/22* (2013.01)

(58) Field of Classification Search
USPC .................................................. 705/7.26
See application file for complete search history.

(56) References Cited

U.S. PATENT DOCUMENTS

| | | |
|---|---|---|
| 7,895,102 B1 | 2/2011 | Wilks et al. |
| 2002/0073005 A1 | 6/2002 | Welnicki et al. |
| 2007/0156559 A1* | 7/2007 | Wolzenski ............. G06Q 40/08 705/35 |
| 2009/0198681 A1* | 8/2009 | Burnstein .............. G06Q 30/02 |
| 2010/0268629 A1 | 10/2010 | Ross et al. |
| 2011/0112985 A1 | 5/2011 | Kocmond |
| 2012/0197818 A1* | 8/2012 | Moran ................... G06Q 40/00 705/36 R |
| 2012/0226690 A1* | 9/2012 | Kheyfets ................ G06Q 10/04 707/737 |
| 2012/0303515 A1* | 11/2012 | Guida .................. G06Q 40/025 705/38 |
| 2015/0199743 A1 | 7/2015 | Pinel et al. |
| 2016/0110810 A1* | 4/2016 | Ashok ..................... H04W 4/21 705/36 R |
| 2016/0267601 A1* | 9/2016 | Kundu ................... G06Q 40/02 |

(Continued)

FOREIGN PATENT DOCUMENTS

WO   WO-2010123706 A1   10/2010

OTHER PUBLICATIONS

Bohyun Kim, Understanding Gamification, 2015, Library Technology Reports, Chapter 2, pp. 10-16 (Year: 2015).*

*Primary Examiner* — Brian M Epstein
*Assistant Examiner* — Allison M Neal
(74) *Attorney, Agent, or Firm* — Schwegman Lundberg & Woessner, P.A.

(57) ABSTRACT

A computer-implemented method may include retrieving, using at least one processor, a goal associated with a user from a user profile; generating, using the at least one processor, based in part on contextual information associated with the user, a plurality of metrics for the goal; based on the plurality of metrics and using the at least one processor, generating an action recommendation with respect to completion of the goal; and presenting the action recommendation to a user device of the user.

18 Claims, 6 Drawing Sheets

(56) References Cited

U.S. PATENT DOCUMENTS

2016/0321935 A1* 11/2016 Mohler ................... G09B 5/08
2016/0371780 A1* 12/2016 Barratt .................. G06Q 40/06
2017/0109680 A1*  4/2017 Apte ................ G06Q 10/06393

* cited by examiner

US 11,238,385 B1

DYNAMIC ELECTRONIC NOTIFICATIONS BASED ON CONTEXTUAL DATA

BACKGROUND

A person or family may create a set of goals that they wish to complete at a future date. The goals may be long term (e.g., retirements savings), intermediate term (e.g., college savings, buying a house), or short term (e.g., vacation planning). The person may use an application to track progress of the goals. For example, the user may indicate he or she has saved 10% of the amount of money needed for a down payment of a house.

TECHNICAL FIELD

This disclosure generally relates to electronic notifications, and in particular, but without limitation to, dynamic electronic notifications based on contextual data.

BRIEF DESCRIPTION OF THE DRAWINGS in the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5 illustrates a flowchart of a method for transmitting an action recommendation, according to various examples; and in which

DETAILED DESCRIPTION

A person or family may create a set of goals that they wish to complete at a future date. The goals may be long term (e.g., retirements savings), intermediate term (e.g., college savings, buying a house), or short term (e.g., vacation planning). The person may use an application to track progress of the goals. For example, the user may indicate he or she has saved 10% of the amount of money needed for a down payment of a house The categorization of the above goals is for discussion purposes and other categorizations may be used. For convenience, the term "user" describes a person that has a set of goals and is working towards the goals. The goals may be initiated by the user or may have been recommended to the user as discussed further herein.

The user may also use the goal tracking application (e.g., a web application, mobile application, etc.) to help manage the user's goals. However, in many instances, the user may be unable to manually keep up with all the updates needed to track the user's progress. Thus, in some instances, the goal tracking application may automatically gather information and update the user's progress. For example, a savings account of a user may be designated as an emergency fund and the goal may be to save $5,000, The user may direct deposit $50 per paycheck the savings account. The goal tracking application may periodically access this account (e.g., using stored credentials) to retrieve the amount deposited. The goal tracking application then updates the goal (e.g., amount in the savings accounts/$5,000 as a percentage).

Even with automatic tracking of goals, problems may exist. For example, consider goals that do not have an explicit money amount or end date such as a goal to buy a house sometime in the next five years. A goal tracking application may be able to track the time period (e.g., how far into the five years), but may be unable to automatically track the user's progress such as the user finding a house, etc. Additionally, the user may not have a good idea of when to buy the house in the next five years. As described in more detail, a technical solution to this problem may include an electronic system that uses current contextual information with respect to the user and goal and suggests electronic actions the user may take to complete or make progress towards the goal. The goal tracking application may be used beyond house planning without departing from the scope of this disclosure.

Figure 1:
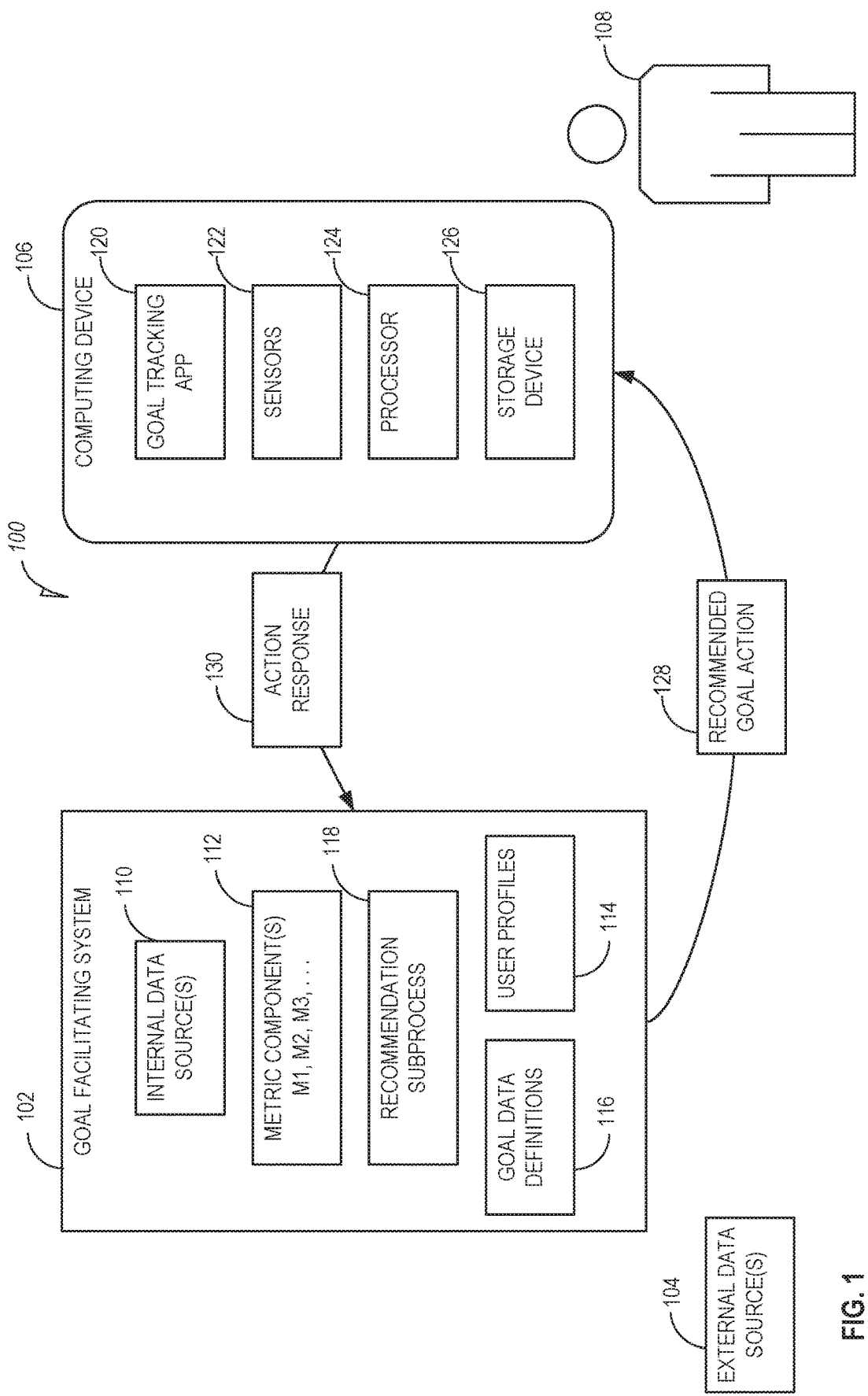
FIG. 1 is a schematic overview of determining a recommendation action, according to various examples.

FIG. 1 is a schematic overview of determining a recommendation action 128. FIG. 1 illustrates goal facilitating system 102, external data sources 104, computing device 106, and user 108. The goal facilitating system 102 may include internal data sources 110, metric components 112, user profiles 114, goal data definitions 116, and recommendation subprocess 118. The computing device 106 may include goal tracking app 120, sensors 122, processor 124, and data storage device 126. A recommendation action 128 may be transmitted from goal facilitating system 102 to computing device 106 as discussed further herein.

Figure 6:
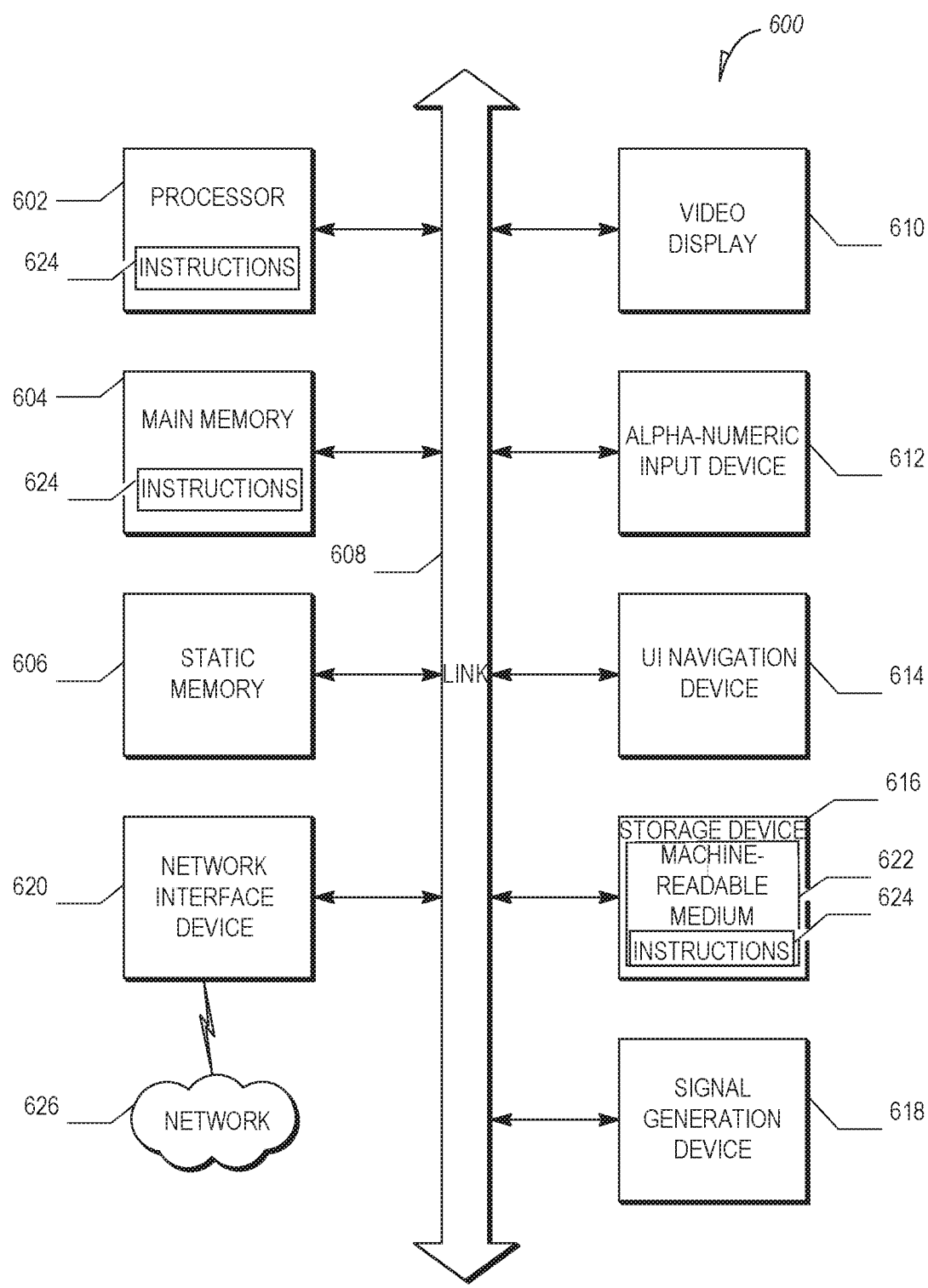
FIG. 6 is a block diagram illustrating an example machine upon which any one or more of the techniques (e.g., methodologies) discussed herein may be performed, according to an example embodiment.

The illustrated items of goal facilitating system 102 may be part of one or more server devices. The term server device is used to describe the general nature of a client/server relationship and does not imply that specialized hardware is required. The items may exist in a single server, be distributed across multiple servers, or duplicated across a set of servers. The servers may exist in a single geographic location or be distributed across multiple locations. A server may include at least one processor (e.g., one or more processing cores), network interface device, and storage device. A server may be a device such as illustrated in FIG. 6, discussed further below.

If the items in goal facilitating system 102 do not exist on a single server, they may communicate via a network. Similarly, goal facilitating system 102, external data sources 104, and computing device 106 may communicate via the network. The network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network may include a single local area network (LAN) or wide-area network (WAN), or combinations of LAN's or WAN's, such as the Internet.

Data used in the goal facilitating system 102 and computing device 106 may be organized and stored in a variety of manners. For convenience, the organized collection of data is described in terms of one or more databases. The specific storage layout and model used in the databases may take a number of forms, indeed, databases may utilize multiple models. A database may be, but is not limited to, a relational database (e.g., SQL), non-relational database (NoSQL) a flat file database, object model, document details model, or a file system hierarchy. The database may store data on one or more storage devices (e.g., a hard disk, random access memory (RAM), etc.). The storage devices may be in standalone arrays, part of one or more servers, and may be located in one or more geographic areas.

In various examples, the goal facilitating system 102 may be used by a user to help manage and provide recommendations to the user regarding established goals. The goal facilitating system 102 may also suggest goals to the user that may be managed by the goal facilitating system 102. The goal facilitating system 102 may be a standalone service to manage goals users or be part of a larger organization such as a social network, financial institution, or the like. A user may create an account with the goal facilitating system 102 and provide information (e.g., age, martial status, etc.) to the goal facilitating system 102 that may be stored in a user profile as part of user profiles 114.

The goal facilitating system 102 may handle a variety of types/categories of goals. Types of goals may include, but are not limited to, vehicle purchases, real estate purchase, college savings, retirement savings, and vacation savings. Different types of goals may have different definitions files (e.g., goal data definitions 116) and associated input and output sources as discussed in more detail with respect to the FIG. 2.

A user may interact with goal facilitating system 102 via goal tracking app 120 on computing device 106. Although computing device 106 is depicted as a mobile phone, other types of computing devices (e.g., laptops, tablets, desktops, etc.) may be used without departing from the score of this disclosure. The goal tracking app 120 may include one or more user interfaces with graphical and textual element to input and output data concerning goals of the user. The goal tracking app 120 may be downloaded from an app store or accessed via a webpage. Data may be provided to the goal tracking app 120 from goal facilitating system 102 using a web server (not shown) that may be associated with, or part of, the goal facilitating system 102.

A user may have an account with goal facilitating system 102. The user may log in to goal facilitating system 102 via goal tracking app 120 using a user name and password generated at the time of the account creation. The goal facilitating system 102 may transmit data related to existing goals or goal creation to the goal tracking app 120 upon successful authenticating the user 108.

Periodically, or in response to different events (e.g., a change in martial status, job status, etc.), metric components 112 may be calculated for one or more of the user's goal. The metric components 112 may be used together to determine an electronic recommendation for the user with respect to the goal. For example, there may be a time urgency component, an interest component, and an affordability component. These components may be determined differently depending on the type of the goal and may use information from both external data sources 104 and internal data sources 110.

Figure 2:
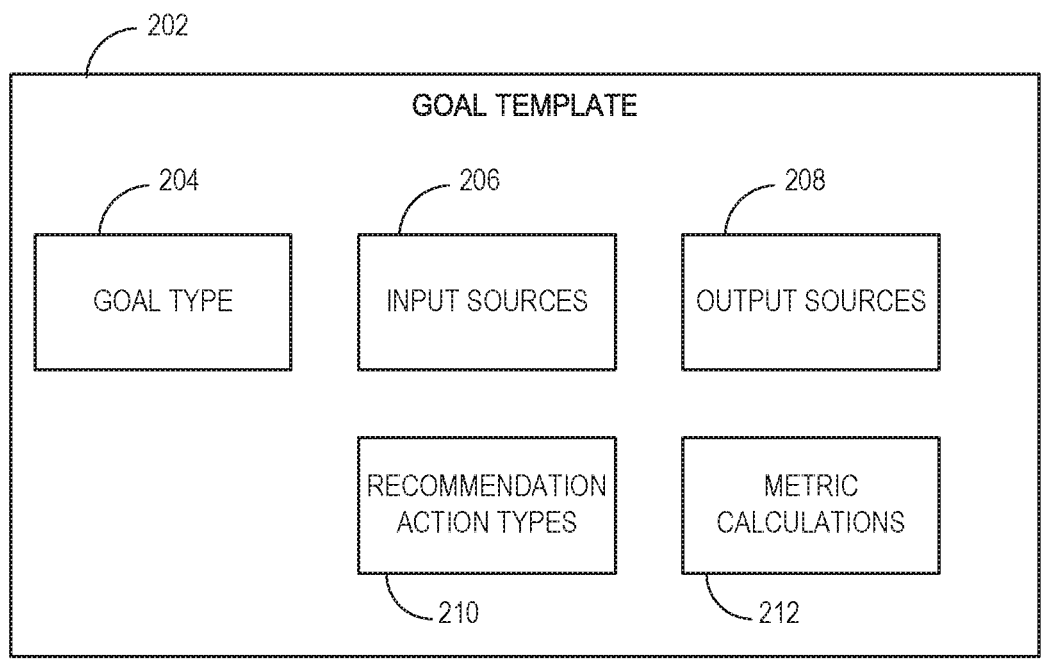
FIG. 2 illustrates a goal template, according to various examples.

FIG. 2 illustrates a goal template 202 that may be stored as part of goal data definitions 116. The goal template 202 includes goal type 204, input sources 206, output sources 208, recommendation action types 210, and metric calculations 212. As a recurring illustration discussed with respect to FIG. 2, consider that a user is using goal tracking app 120 to generate a goal. The goal template 202 may be formatted as an XML file with different portions for each of the goal type 204, input sources 206, output sources 208, recommendation action types 210, and metric calculations 212. Other formats and organizations may be used without departing from the scope of this disclosure.

The goal type 204 may identify the type of goal. When the user initially indicates they wish to create a goal, a type may be selected. The type be used to retrieve the proper goal template. Some goal templates may be relevant for multiple types of goals. Goals types may be related to the intended use of money saved (e.g., college savings, retirement, car purchase) or more generic (e.g., saving a fixed amount of money).

The goal type 204 may also identify what information to request from the user to finish generating the goal. For example, if the goal is a savings goal, the goal type portion of the goal template 202 may indicate user inputs of a dollar amount, and time to save the dollar amount. Not all information requested may be required to generate the goal. Accordingly; a user may enter in a dollar amount to save, but not indicate a specific time horizon to save the amount. The goal type portion may indicate whether or not the information is required (e.g., as an XML attribute <information required="no">).

The input sources 206 may designate the location and format (e.g., a dollar amount, a string length, etc.) of data sources used in the metric calculations 212. Input sources may include, but are not limited to, financial accounts, social media accounts, sensor readings from a mobile device, e-mail accounts, location data, educational accounts, and health data. The input sources 206 may also include a path to data for a given input source. For example, an application programming interface (API) may be used to retrieve data from an input source. The API path (e.g., http://*.*/datasource/retrieve.json?id=userid&accesskey=3d.f33ds) for the input source may be included in the input sources portion of the goal template 202. An input source may also be an internal source (e.g., internal data sources 110). In such an instance, an identification of a SQL query for accessing the data may included in the XML file. Input sources may also be data entered by a user during the goal creation (e.g., a requested amount to save).

The input sources 206 may also indicate whether or not credentials (e.g., username, password, token) are required to access a respective input source; and if so, what type of credential. As with information in the goal type 204, input sources may have a designation of whether or not they are required.

After a user selects a type of goal, the goal tracking app 120 may access (e.g., as stored on the computing device 106 or retrieved from goal facilitating system 102) the goal template corresponding to the type. The goal tracking app 120 may then parse the template to access the input sources portion. Based on what is included in this portion, the goal tracking app 120 may prompt the user to enter in account details, including account identifiers and account credentials. For example, if the input sources portion indicate a financial account is required for tracking (e.g., a savings account), the goal tracking app 120 may prompt the user to enter in the account information. The goal tracking app 120 may store the results as part of a goal data file associated with the user (discussed further herein). In other words, each user may have multiple goal data files, one for each goal.

The output sources 208 may designate the location and format (e.g., a dollar amount, a string length, etc.) of data sources used in implementing selected actions of a user. Output sources may include, but are not limited to, financial accounts, e-commerce websites, e-mail accounts, educational accounts, and search engines. The output sources 208 may include a path to data for a given output source. For example, an application programming interface (API) may be used to post data to an output source. The API path (e.g., http://*.*/datasource/
post.json?id=userid&accesskey=3df33ds) for the output source may be included in the output sources portion of the goal template 202.

The output sources 208 may also indicate whether or not credentials (e.g., username, password, token) are required to access a respective output source, and if so, what type. Output sources may have a designation of whether or not they are required.

After the user selects a type of goal, the goal tracking app 120 may access (e.g., as stored on the computing device 106 or retrieved from goal facilitating system 102) the goal template corresponding to the type. The goal tracking app 120 may then parse the template to access the output sources portion Based on what is included in this portion, the goal tracking app 120 may prompt the user to enter in account details, including account identifiers and account credentials. For example, if the output sources portion indicate a financial account is required for transferring money to (e.g., a savings account), the goal tracking app 120 may prompt the user to enter in the account information. The goal tracking app 120 may store the results as part of a goal data file associated with the user.

In some instances, input and output sources may be the same. For example, a financial account used an input source may also be used to deposit money into. Thus, if a user has entered in credentials for the account as part of the input source, the user need not be prompted again. In some examples, the data required by the input sources and output sources may be included in a user profile. In such instances, prompts to the user may be unnecessary.

Recommendation action types 210 may correspond to suggested actions that may be taken by a user for a given goal. The action types may be categorized as passive or active action types. A passive action type may be a push notification with information to the user, whereas an active action type may require a response from the user. Different goal types may have different action types. Consequently, the action type portion of goal template 202 may identify one or more recommendation actions corresponding to a metric component (discussed further herein). For example, a passive action type notification may be pushed to a user indicating they should consider adding more to their retirement account if a metric calculation goes above a certain threshold.

An action type may be also reference input sources 206 or output sources 208. For example, an action type may include a string definition such as "Hello, %input source id.name%. We see your current balance is %input.source.financialaccount%. Consider adding more to this account in the next three months." If the action type is an active type, strings used in response options may be defined such as "Confirm transfer of $500 from %inputsource.finacialaccount% to %outputsource.financialaccount%". When an action type is triggered such as when the metric calculation is met the referenced input and output sources may be accessed (e.g., using an API) to complete the string.

The metric calculations 212 may define how to calculate metric components for a given goal. In turn, the results of these calculations may be used to trigger one or more of the recommendation action types 210. The metric calculations 212 may be calculated periodically or in response to specific events. The metric calculation portion of the goal template 202 may identify trigger events for, or the period for, calculating a component. For example, an affordability component may be calculated once a day whereas an interest component may be calculated when a life event has occurred (e.g., birth of a child, marriage, etc.). In some instances, the metric calculations 212 define a specific formula for a component. In other instances, a lookup table may be used. For example, an increase in available cash flow of X dollars corresponds to a '2' rating.

The output of calculating a component may be standardized across components. In other words, even if the range of values for the time urgency component is 0-1000 and the affordability component is 0-100, both components may be scaled to a 1-5 rating. The precise numbers are given as examples only, and other ranges and standardizations may be used without departing from the scope of this disclosure. The standardization level may be defined in metric calculations 212.

An overall metric score may also be calculated based on the set of components. Different weights may be given to different components, which may be defined in the metric calculations 212. The recommendation action types 210 may be triggered based on the overall metric score or individual components.

A time urgency component may represent how quickly an action must be taken with respect to the goal. By way of example, consider that the user has expressed interest in buying a home. During the goal creation process, the user may input the user's price preferences and location preferences for the home purchase. One external source of the goal facilitating system 102 may be a multiple listing service (MLS). The goal facilitating system 102 may calculate the average sales price in the user designated area. The average may be tracked over time to determine a trend. If the trend is upward, the formula or lookup table for calculating the time urgency score may result in a higher value thereby that the user should be taking action sooner rather than later. For example, a baseline time urgency score may be '3' and for each increase in prices above 10% of a defined period, the score may be increased by '1.'

The time urgency component may look also at market trends and the user's cash flow to calculate a score. For example, current interest rates and forecasted interest rates may be examined. Thus, if the current interest rates are predicted to go up, thereby by making a purchase of an asset less affordable, the time urgency score may be increased. Conversely, if interest rates are predicted to decrease, the time urgency score may be decreased.

An interest component may reflect a user's interest in the goal at a particular time. For example, input sources for the interest component may include a user's search history and social media posts. If the user goal is a car purchase, the the value of the interest component may be higher if the user has recently (e.g., within the past week) searched for cars or posted on social media asking about recommendations for cars. The interest component may also access social media profile of the user that indicate the user's likes. The score may also examine users that are similar to the user (e.g., similar demographically, similar likes, etc). If those users have also expressed interest (e.g., posted on social media, etc.) in a similar goal the interest component score may be increased. The interest score may also look at where the user spends their time for work and for hobbies.

The affordability component may look at the user's ability to currently afford the goal. The affordability score may use a debt-to-income calculation, or other formula, to determine affordability. The affordability score may also use goal outcomes of financially similar to the current user. In other words, if similar users fail to complete a goal of, for example, purchasing a 30k car, the affordability score may be decreased. The goal facilitating system 102 may track goal completion and progress across all users. Thus, an input source for the affordability component may internal data of the goal facilitating system 102.

Figure 3:
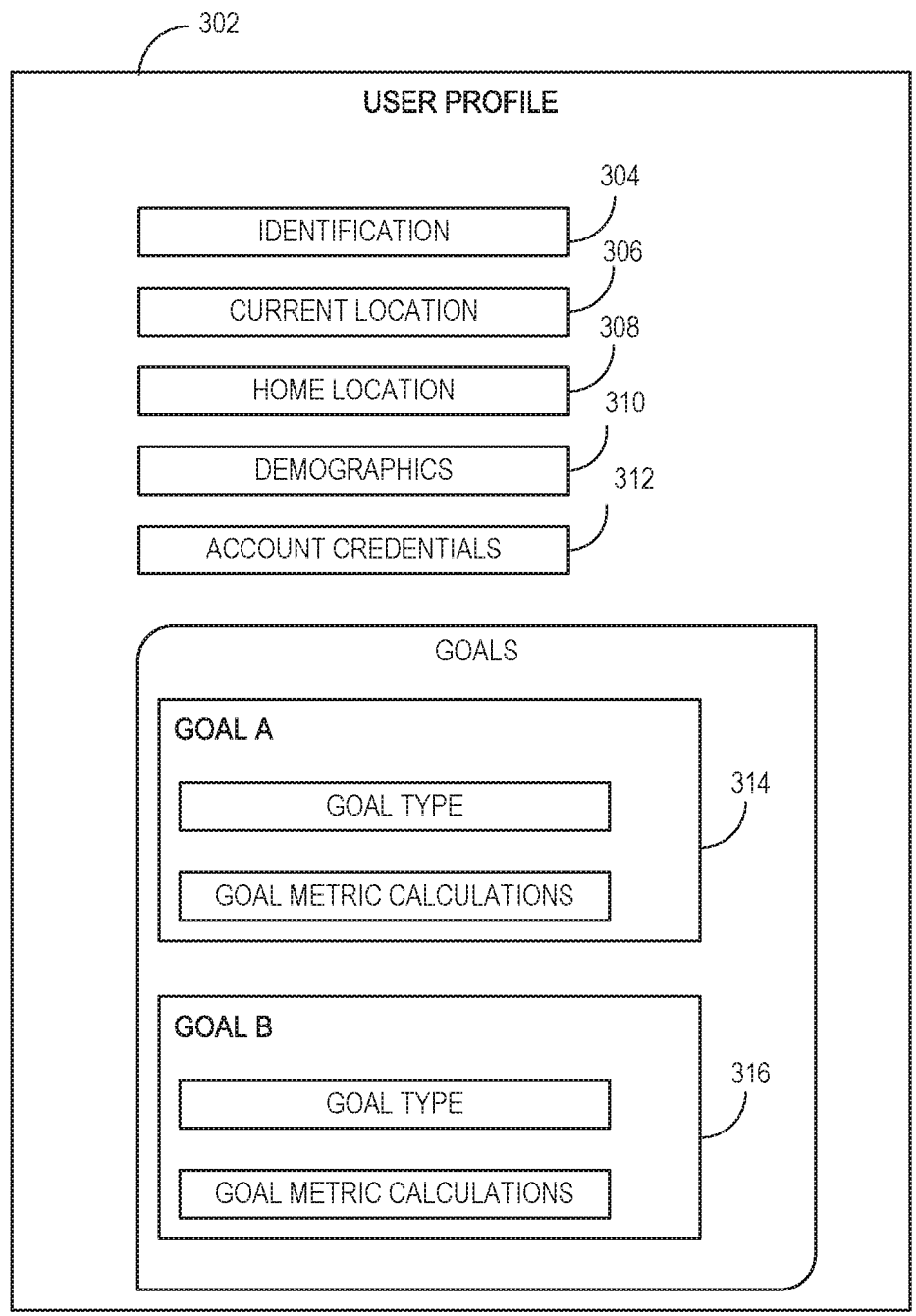
FIG. 3 illustrates a schematic diagram of a user profile, according to various embodiments

FIG. 3 illustrates a schematic diagram of a user profile 302, according to various embodiments. The user profile 302 may be stored in user profiles 114 of the goal facilitating system 102. The information in the user profile 302 may be compiled from a variety of sources, including internal data sources 110, external data sources 104, input by the user using the goal tracking app 120, and sensor of the computing device 106. A copy of the user profile 302 may also be stored on the computing device 106.

As illustrated, the user profile 302 includes identification 304, current location 306, home location 308, demographics 310, and account credentials 312. The user profile 302 may also include one or more goal definition files, such as goal 314 and goal 316. The identification 304 may be a user identification that the user users to log in to the goal facilitating system 102 (e.g., via the goal tracking app 120).

The current location 306 may refer to the current location of the computing device 106 (e.g., as reported by the operating system of the computing device 106). Accordingly, if a metric calculation is based on a specific location, the current location 306 may be used to trigger the calculation. For example, a list of locations that are used to trigger metric calculations may be stored within the user profile 302. Periodically, the goal tracking app 122 may compare the current location 306 to the list to see if a metric calculation should be calculated. The comparison may include using geofencing around areas in the list (e.g., a 2-mile radius).

The demographics 310 may include demographic data of the user. The demographic data may include, but is not limited to, age, sex, job, marital status, number of children, address, credit score, etc. Periodically (every week or month), the goal tracking app 120 may update the demographics 310. The user tracking app 120 may prompt the user to enter in updated information or the user tracking app 120 may access data repositories that already include demographic data.

The account credentials 312 may include user names and passwords to other accounts of the users such as social media accounts and financial accounts. The account credentials 312 may also include cryptographic tokens that provide access to the accounts. The user tracking app 120 may prompt the user for the credentials at the time the user's profile is created. In another example, the user tracking app 120 may prompt the user for credentials after the goals have been created and it is determined what accounts are required for the appropriate metric calculations.

The goals in the user profile 302 may include user entered goals or goals recommended to the user. The goal 314 is illustrated as including a goal type and goal metric calculations. The goal 314 may also include other data not illustrated in FIG. 3 such as the recommended actions for the goal. In an example, the goal 314 may include a complete goal data definition using a template as described previously. The goal metric calculations may be updated according to the goal data definition file for the respective goal type.

The user profile 302 may also include notification preferences of the user. For example, the preferences may include one or more electronic addresses (e.g., e-mails, phone numbers, social media accounts) to receive the goal recommendation actions.

Figure 4:
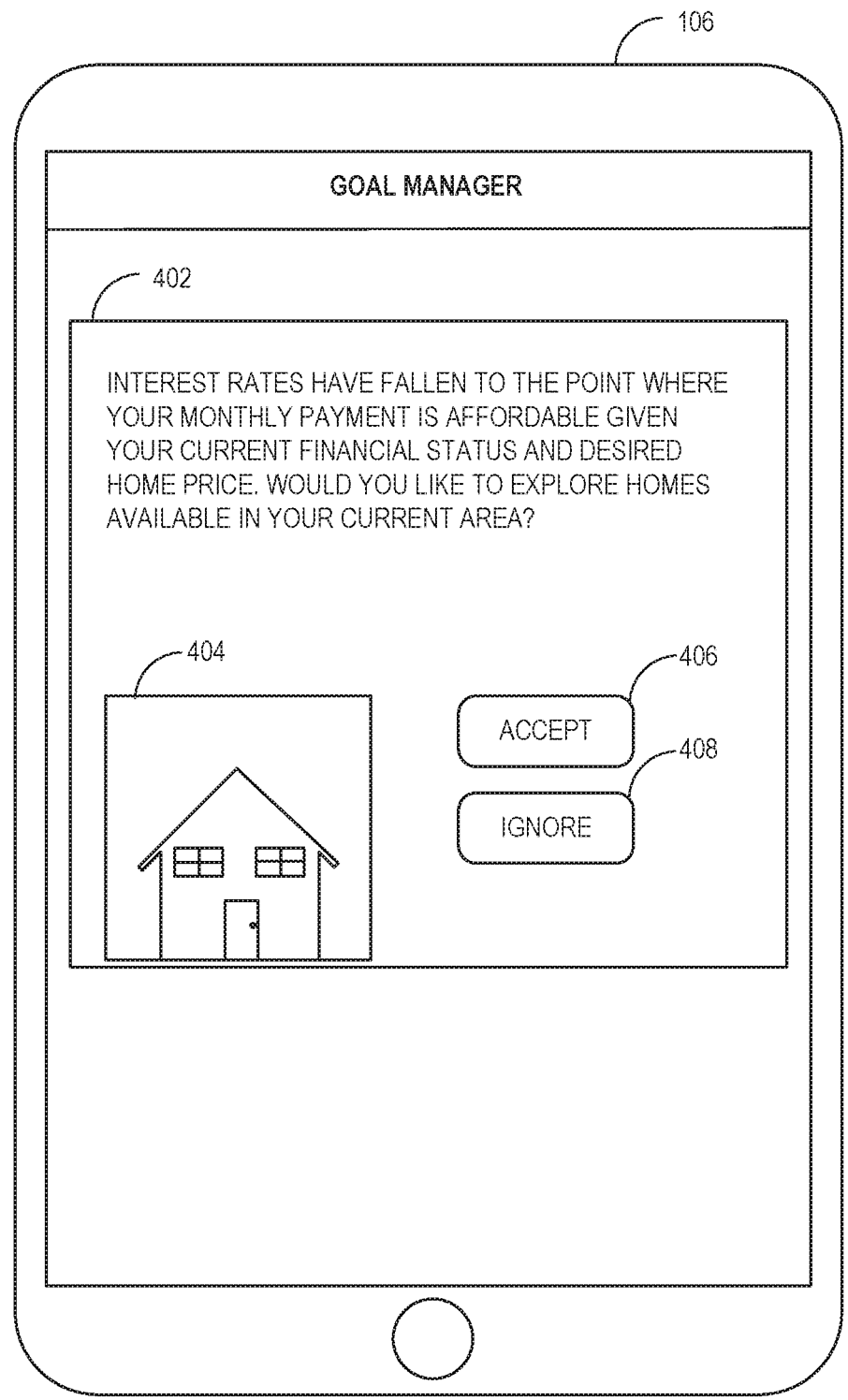
FIG. 4 illustrates a user interface, according to various examples.

FIG. 4 illustrates a user interface 402, according to various examples. The user interface 402 may represent a recommended goal action related to a real estate goal. The user interface 402 includes a graphic 404 and action responses 406 and 408. The graphic 404 may provide a visual indication of the type of the goal. The graphic may be identified in the goal template. Similarly, the action responses 406 and 408 may be identified in the goal template as described above.

As illustrated, the recommended goal action is an active recommendation. The recommended goal action may have been triggered based on the metric calculations exceeding a certain threshold such as the affordability component indicating the goal of a buying a house in a previously indicated price range is now possible based on the user's income.

The above described systems and applications may facilitate a number of use cases beyond the relatively simple asset purchase. For example, the goal facilitating app 120 may determine (e.g., by monitoring financial accounts of the user) that a user has an increase in available cash flow such as an increase in a paycheck. The goal facilitating app 120 may then rerun some or all metric calculations for the user's goals. Based on the calculations a more than one goal action may be recommended for different goals such as an action to apply for a home loan or increase the user's retirement funds. One of the actions may first be presented to the user and if the user decline the recommendations, another of the recommendations may be presented. A threshold increase/decrease in cash flow may used as a trigger for the calculations of the metrics.

In some instances, a recommendation may include actions for multiple goals. For example, using the increased cash flow, the recommendation may include putting 5% of the new amount towards debt reductions and 15% to savings towards a down payment. The recommendation may also include how accepting the recommendation may affect the user's cash flow for a given time period.

There may be other trigger events that cause some or all metric calculations to be updated. For example, the demographic data may indicate a child was recently born and a recommendation to start a 529 plan may be transmitted. A more targeted recommendation may include a specific amount or percentage to contribute to the plan.

In another example, the recommendation may include an option (e.g., a user interface element) to see how the recommendation was presented to the user. Activating the option (e.g., via a tap or click) may present the metric calculations or the trigger event that caused the recommendation.

Figure 5:
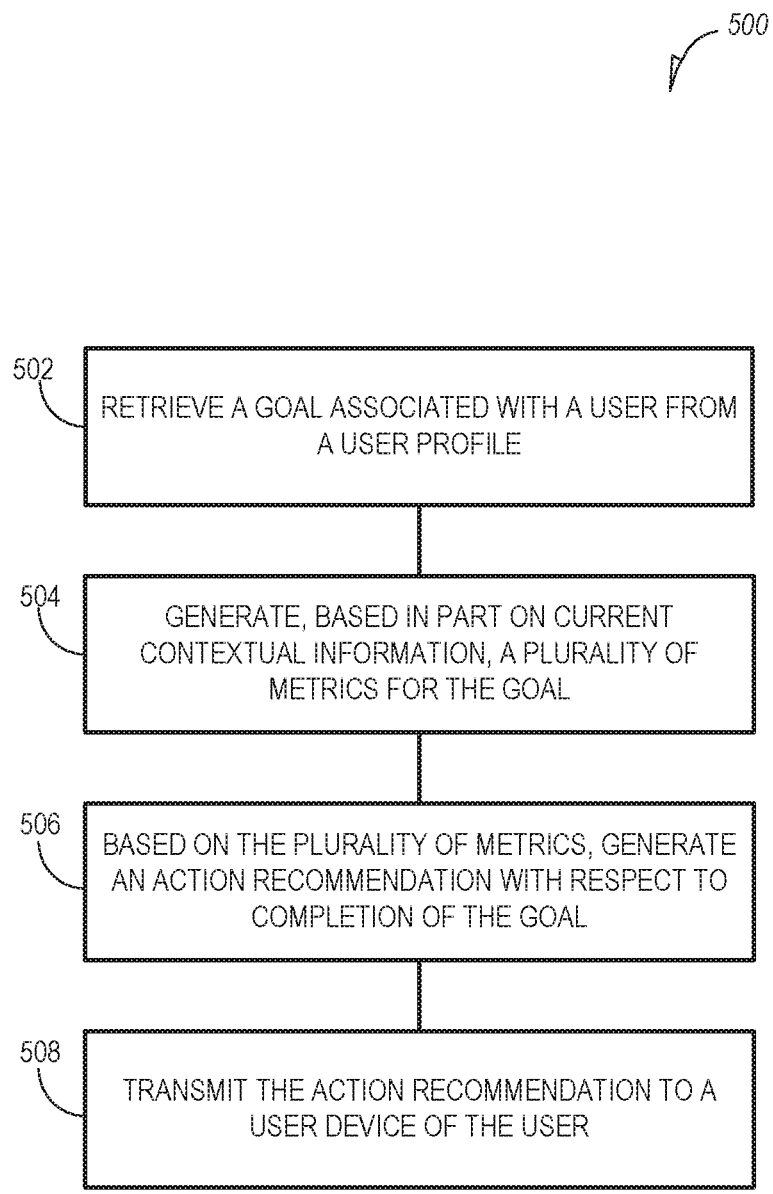

FIG. 5 illustrates a flowchart of a method for transmitting an electronic action recommendation. The method may be performed by a processing device (e.g., a processing core, an application specific circuit, etc.) executing computer instructions that configure the processing device to perform the operations described herein. The processing device may interact with other hardware components to implement the operations. For example, a network interface device may transmit data packets to another computing device.

At operation 502, a goal associated with a user profile may be retrieved. The user profile may be stored remote from a computing device of the user or on a user's computing device. The goals may be stored as part of a XML file or other structured data store. Retrieving may include parsing the user profile or querying a database to access a subset of the user profile.

At operation 504, a plurality of metrics for the goal may be generated. The metrics may be based on contextual information associated with the user. Contextual information may include location data, financial data, and/or demographic data of the user. The contextual information may be stored or accessible in one or more input sources.

To generate the metrics, definition data for the goal may be retrieved. The definition data may be stored with the user profile or on a separate device. The definition data may include a set of input sources for a metric of the plurality of metrics. The input sources may be queried for data associated with the first metric. The definition data may indicate which sources to query and what information to query. Input sources may include financial accounts of the user and social media accounts of other users. Generating the metrics may be initiated based on a variety of trigger events such as detecting a change in location of the user device or detecting a change in martial status of a user.

At operation 506, an electronic action recommendation with respect to the completion of the goal may be generated. The electronic action recommendation may be based on the plurality of metrics. Generating the action recommendation may include combining (e.g., summing) a plurality of metrics for the goal to determine a combined value. The combined value may be compared to a threshold. The threshold may be included in the definition data. The plurality of metrics may be standardized before being combined.

At operation 508, the electronic action recommendation may be presented to a user device of the user. Presenting may include displaying the action recommendation on a display device. In an example, presenting may include transmitting a push notification to the user device. A response action may be received from the user device. The response action may be performed on the user device. Performance may include transmitting data to an output source indicated in the definition data of the goal.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules; which operate to perform the methodologies described herein.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments; the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system; wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly; the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard); and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any, one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:
receiving, using at least one processor, sensor data regarding a user from a plurality of sensors including a global positioning system (GPS) sensor and an accelerometer;
creating, using the at least one processor, a user profile for the user using multiple data sources in multiple data formats, the multiple data sources including the plurality of sensors, wherein the user profile includes a list of locations used to trigger metric calculations;
retrieving; using the at least one processor, a goal associated with the user from the user profile, the goal having a goal type;
accessing; using the at least one processor, a goal template corresponding to the goal type;
parsing, using the at least one processor, the goal template to access an output sources portion of the goal template;
prompting, using the at least one processor, the user for credentials associated with an output source listed in the output sources portion;
responsive to a determination using the sensor data that the user is located within a geofenced area around a location from the list of locations, generating, using the at least one processor, based in part on contextual information associated with the user, a plurality of metrics for the goal, the plurality of metrics including an affordability metric, a time urgency metric, and an interest metric, wherein generating includes:
accessing definition data for the goal for the time urgency metric, the definition data defining an input source for the time urgency metric; the input source identifying an external data source including a location path of data for the time urgency metric;
querying the input source using the location path of data for data associated with the time urgency metric, the data associated with the time urgency metric including an average sales price of a home in a location;
formatting, using the at least one processor, the data received from the input source using a designated input data format;
storing, using the at least one processor, the formatted data in a storage location accessible to a plurality of users;
generating the time urgency metric based on the average sales price of a home in a location and forecasted loan interest rates, the time urgency metric having a range of values between a first upper limit and a first lower limit;
generating the affordability metric once per day on a periodic schedule, the affordability metric having a range of values between a second upper limit and a second lower limit; and
generating the interest metric upon occurrence of a predetermined trigger life event;
scaling each of the plurality of metrics to a range of values between a third upper limit and a third lower limit;
calculating a combined score for the goal using a weighted combination of the scaled plurality of metrics;
comparing the combined score to a threshold;
based on the comparing and using the at least one processor, generating an action recommendation with respect to completion of the goal; the action recommendation including a prompt for a response action from the user, the response action including automatic transmission of at least some of the stored and formatted data to the output source using the credentials; and
providing a dynamic electronic notification to the user, the dynamic electronic notification based on a triggered action type and including presenting the action recommendation to a display of a user device of the user.

2. The method of claim 1, wherein generating the plurality of metrics further comprises:
   accessing definition data for the goal for a first metric of the plurality of metrics, the definition data including a set of input sources;
   querying the set of input sources for data associated with the first metric; and
   generating the first metric based on the data associated with the first metric.

3. The method of claim 2, wherein the first metric is the affordability metric and the set of input sources include goal completion data from other users with respect to the goal.

4. The method of claim 2, wherein the first metric is the interest metric and the set of input sources include social media accounts of other the user, and the data associated with first metric includes a posting history of the user.

5. The method of claim 1, wherein calculating the combined score based on the plurality of metrics comprises:
   standardizing each of the plurality of metrics to a common scale;
   calculating the combined score based on the standardizing.

6. The method of claim 1, further comprising:
   performing; using the at least one processor, the response action.

7. The method of claim 1, further comprising:
   detecting a change in location of a mobile device; and
   wherein generating the plurality of metrics for the goal is initiated based at least in part on the change.

8. The method of claim 1, further comprising:
   detecting a change in marital status of the user; and
   wherein generating the plurality of metrics for the goal is initiating based at least in part on the change.

9. A non-transitory computer-readable medium with instructions stored thereon, which when executed by at least one processor, configure the at least one processor to perform operations comprising:
   receiving sensor data regarding a user from a plurality of sensors including a global positioning system (GPS) sensor and an accelerometer;
   creating a user profile for the user using multiple data sources in multiple data formats, the multiple data sources including the plurality of sensors, wherein the user profile includes a list of locations used to trigger metric calculations;
   retrieving from a data storage device, a goal associated with the user from the user profile, the goal having a goal type;
   accessing a goal template corresponding to the goal type;
   parsing the goal template to access an output sources portion of the goal template;
   prompting the user for credentials associated with an output source listed in the output sources portion;
   responsive to a determination using the sensor data that the user is located within a geofenced area around a location from the list of locations, generating, based in part on contextual information associated with the user, a plurality of metrics for the goal, the plurality of metrics including an affordability metric, a time urgency metric, and an interest metric, wherein generating includes:
   accessing definition data for the goal for the time urgency metric, the definition data defining an input source for the time urgency metric, the input source identifying an external data source including a location path of data for the time urgency metric;
   querying the input source using the location path of data for data associated with the time urgency metric, the data associated with the time urgency metric including an average sales price of a home in a location;
   formatting the data received from the input source using a designated input data format;
   storing the formatted data in a storage location accessible to a plurality of users;
   generating the time urgency metric based on the average sales price of a home in a location and forecasted loan interest rates, the time urgency metric having a range of values between a first upper limit and a first lower limit;
   generating the affordability metric once per day on a periodic schedule, the affordability metric having a range of values between a second upper limit and a second lower limit; and
   generating the interest metric upon occurrence of a predetermined trigger life event;
   scaling each of the plurality of metrics to a range of values between a third upper limit and a third lower limit;
   calculating a combined score for the goal using a weighted combination of the scaled plurality of metrics;
   comparing the combined score to a threshold;
   based on the comparing, generating an action recommendation with respect to completion of the goal, the action recommendation including a prompt for a response action from the user, the response action including automatic transmission of at least some of the stored and formatted data to the output source using the credentials; and
   providing a dynamic electronic notification to the user, the dynamic electronic notification based on a triggered action type and including presenting the action recommendation to a display of a user device of the user.

10. The computer-readable medium of claim 9, wherein the operation of generating the plurality of metrics further comprises:
   accessing definition data for the goal for a first metric of the plurality of metrics, the definition data including a set of input sources;
   querying the input sources for data associated with the first metric; and
   generating the first metric based on the data associated with the first metric.

11. The computer-readable medium of claim 10, wherein the first metric is the affordability metric and the set of input sources include goal completion data from other users with respect to the goal.

12. The computer-readable medium of claim 10, wherein the first metric is the interest metric and the set of input sources include social media accounts of other the user, and the data associated with first metric includes a posting history of the user.

13. The computer-readable medium of claim 9, the operations further comprising:
   detecting a change in location of a mobile device; and
   wherein generating the plurality of metrics for the goal is initiated based at east in part on the change.

14. The computer-readable medium of claim 9, the operations further comprising:
   detecting a change in marital status of the user; and
   wherein generating the plurality of metrics for the goal is initiating based at least in part on the change.

15. A system comprising:
at least one processor a storage device with instructions stored thereon, which when executed by at least one processor, configure the at least one processor to:
receive sensor data regarding a user from a plurality of sensors including a global positioning system (GPS) sensor and an accelerometer;
create a user profile for the user using multiple data sources in multiple data formats, the multiple data sources including the plurality of sensors, wherein the user profile includes a list of locations used to trigger metric calculations;
retrieve from a data storage device, a goal associated with the user from the user profile, the goal having a goal type;
access a goal template corresponding to the goal type;
parse the goal template to access an output sources portion of the goal template;
prompt the user for credentials associated with an output source listed in the output sources portion;
responsive to a determination using the sensor data that the user is located within a geofenced area around a location from the list of locations, generate, based in part on contextual information associated with the user, a plurality of metrics for the goal, the plurality of metrics including an affordability metric, a time urgency metric, and an interest metric, wherein generating includes:
access definition data for the goal for the time urgency metric, the definition data defining an input source for the time urgency metric, the input source identifying an external data source including a location path of data for the time urgency metric;
query the input source using the location path of data for data associated with the time urgency metric, the data associated with the time urgency metric including an average sales price of a home in a location;
format the data received from the input source using a designated input data format;
store the formatted data in a storage location accessible to a plurality of users;
generate the time urgency metric based on the average sales price of a home in a location and forecasted loan interest rates, the time urgency metric having a range of values between a first upper limit and a first lower limit;
generate the affordability metric once per day on a periodic schedule, the affordability metric having a range of values between a second upper limit and a second lower limit; and
generate the interest metric upon occurrence of a predetermined trigger life event;
scale each of the plurality of metrics to a range of values between a third upper limit and a third lower limit;
calculate a combined score for the goal using a weighted combination of the scaled plurality of metrics;
compare the combined score to a threshold;
based on the comparison, generating an action recommendation with respect to completion of the goal, the action recommendation including a prompt for a response action from the user, the response action including automatic transmission of at least some of the stored and formatted data to the output source using the credentials; and
provide a dynamic electronic notification to the user, the dynamic electronic notification based on a triggered action type and including presenting the action recommendation to a display of a user device of the user.

16. The system of claim 15, wherein to generate the plurality of metrics, the at least one processor is further configured to:
access definition data for the goal for a first metric of the plurality of metrics, the definition data including a set of input sources;
query the set of input sources for data associated with the first metric; and
generate the first metric based on the data associated with the first metric.

17. The system of claim 16, wherein the first metric is the affordability metric and the set of input sources include goal completion data from other users with respect to the goal.

18. The system of claim 16, wherein the first metric is the interest metric and the set of input sources include social media accounts of other the user, and the data associated with first metric includes a posting history of the user.

* * * * *

UNITED STATES PATENT AND TRADEMARK OFFICE
CERTIFICATE OF CORRECTION

PATENT NO. : 11,238,385 B1  
APPLICATION NO. : 15/152141  
DATED : February 1, 2022  
INVENTOR(S) : Crowder et al.

Page 1 of 1

It is certified that error appears in the above-identified patent and that said Letters Patent is hereby corrected as shown below:

In the Claims

In Column 12, Line 10, in Claim 1, delete "retrieving;" and insert --retrieving,-- therefor In Column 12, Line 13, in Claim 1, delete "accessing;" and insert --accessing,-- therefor In Column 12, Line 30, in Claim 1, delete "metric;" and insert --metric,-- therefor In Column 12, Line 61, in Claim 1, delete "goal;" and insert --goal,-- therefor In Column 13, Line 27, in Claim 6, delete "performing;" and insert --performing,-- therefor In Column 14, Line 62, in Claim 13, delete "east" and insert --least-- therefor Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*